(12) United States Patent
Kapadia

(10) Patent No.: US 10,544,740 B2
(45) Date of Patent: Jan. 28, 2020

(54) GAS TURBINE ENGINE WITH COOLING AIR SYSTEM

(71) Applicant: Rolls-Royce Corporation, Indianapolis, IN (US)

(72) Inventor: Behram V. Kapadia, McCordsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 583 days.

(21) Appl. No.: 15/070,309

(22) Filed: Mar. 15, 2016

(65) Prior Publication Data

US 2017/0268429 A1  Sep. 21, 2017

(51) Int. Cl.
*F02C 9/18* (2006.01)
*F02C 3/04* (2006.01)
*F02C 7/18* (2006.01)
*F02C 6/08* (2006.01)

(52) U.S. Cl.
CPC .................. *F02C 9/18* (2013.01); *F02C 3/04* (2013.01); *F02C 7/18* (2013.01); *F02C 6/08* (2013.01); *F02C 7/185* (2013.01); *F05D 2260/221* (2013.01)

(58) Field of Classification Search
CPC ...... F02C 9/18; F02C 6/08; F02C 7/18; F02C 7/185; F02C 9/52
See application file for complete search history.

(56) References Cited

U.S. PATENT DOCUMENTS

| | | |
|---|---|---|
| 2,951,340 A | 9/1960 | Howald |
| 3,584,458 A | 6/1971 | Wetzler |
| 3,663,118 A | 5/1972 | Johnson |
| 3,958,412 A | 5/1976 | Frederick |
| 4,213,738 A | 7/1980 | Williams |
| 4,296,599 A | 10/1981 | Adamson et al. |
| 5,575,616 A | 11/1996 | Hagle et al. |
| 5,996,331 A | 12/1999 | Palmer |
| 6,615,574 B1 * | 9/2003 | Marks .................. F02C 7/18 60/772 |
| 8,549,865 B2 | 10/2013 | Thiyagarajan et al. |
| 8,684,660 B2 | 4/2014 | Miranda et al. |
| 2006/0005546 A1 * | 1/2006 | Orlando ............... F01D 9/065 60/782 |
| 2009/0155053 A1 | 6/2009 | Speak |
| 2013/0051976 A1 | 2/2013 | Kirtley |
| 2013/0192250 A1 * | 8/2013 | Glahn .................. F01D 11/04 60/782 |

* cited by examiner

*Primary Examiner* — Todd E Manahan
*Assistant Examiner* — Katheryn A Malatek
(74) *Attorney, Agent, or Firm* — Barnes & Thornburg LLP

(57) ABSTRACT

A gas turbine engine including an engine core and a cooling air system is disclosed herein. The cooling air system is fluidly coupled between a compressor section of the engine core and a turbine section of the engine core to conduct pressurized air from the compressor section to the turbine section to cool components of the turbine section.

16 Claims, 2 Drawing Sheets

GAS TURBINE ENGINE WITH COOLING AIR SYSTEM

FIELD OF THE DISCLOSURE

The present disclosure relates generally to gas turbine engines, and more specifically to gas turbine engines including cooling air systems.

BACKGROUND

Cooling air systems may be used in gas turbine engines to deliver cooling air to components of the gas turbine engines during operation of the gas turbine engines by cooling air passageways. These cooling air systems may be conservatively designed to conduct more cooling air than is required in order to account for breakages that may occur in the cooling air passageways. Such designs can result in wasted cooling air when the cooling air passageways are intact, reducing the efficiency of a gas turbine engine.

SUMMARY

The present disclosure may comprise one or more of the following features and combinations thereof.

According to one aspect of the present disclosure, a gas turbine engine may include an engine core and a cooling air system. The engine core may define a central axis and the engine core may include a compressor section and a turbine section located aft of the compressor section along the central axis. The cooling air system may be fluidly coupled between the compressor section and the turbine section to conduct pressurized air from the compressor section to the turbine section to cool components of the turbine section. The cooling air system may include a plurality of main flow passageways each having a forward end coupled to the compressor section and an aft end coupled to the turbine section, and each of the plurality of main flow passageways may be configured to conduct a main flow of cooling air provided by the compressor section to the turbine section to cool the turbine section during operation thereof. Additionally, the cooling air system may include a plurality of control flow passageways each fluidly coupling a first main flow passageway to a second main flow passageway, and each of the control flow passageways may be configured to discharge a control flow of cooling air, smaller than the main flow of cooling air, away from the first main flow passageway into the second main flow passageway in a direction so as to resist the main flow of the cooling air conducted by the second main flow passageway.

In some embodiments, the control flow passageways may be shaped to direct the control flow away from the turbine section toward the compressor section. Additionally, in some embodiments, the main flow passageways may be circumferentially spaced around the central axis and the control flow passageways may extend circumferentially about and along the central axis.

In some embodiments, the compressor section may include a low pressure compressor and a high pressure compressor located aft of the low pressure compressor along the central axis, and the forward end of at least one of the main flow passageways may be fluidly coupled directly to the low pressure compressor. The turbine section may include a high pressure turbine coupled to the high pressure compressor to drive rotation of the high pressure compressor about the central axis and a low pressure turbine coupled to the low pressure compressor to drive rotation of the low pressure compressor about the central axis and located aft of the high pressure turbine along the central axis, and the aft end of the at least one of the main flow passageways may be fluidly coupled directly to the high pressure turbine.

In some embodiments, the cooling air system may be configured in a normal state, the normal state characterized by the absence of breakages in the main flow passageways, to conduct main flow through each of the main flow passageways substantially at a first flow rate. The cooling air system may be configured in a fault state, the fault state characterized by the presence of a breakage in one of the main flow passageways, to conduct main flow through the first main flow passageway substantially at a second flow rate, less than the first flow rate, and to conduct main flow through the second main flow passageway substantially at a third flow rate, greater than the first flow rate. The third flow rate may be substantially equal to twice the first flow rate. Additionally, in some embodiments, the cooling air system may be configured when in the fault state to conduct substantially the same rate of the main flow of cooling air as when in the normal state.

According to another aspect of the present disclosure, a cooling air system for a gas turbine engine having an engine core defining a central axis may include a plurality of main flow passageways and a plurality of control flow passageways. The plurality of main flow passageways may each be configured to fluidly couple a compressor section of an engine core to a turbine section of an engine core to conduct a main flow of cooling air. The plurality of control flow passageways may each be fluidly coupled between a first main flow passageway and a second main flow passageway to conduct a control flow of cooling air bled off from the main flow of cooling air away from the first main flow passageway to the second main flow passageway when the cooling air system is used in a gas turbine engine. The control flow passageways may be shaped to discharge control flow into the main flow passageways to at least in part directly resist main flow through the main flow passageways aftward along the central axis.

In some embodiments, the control flow passageways may be shaped so that the control flow discharged into the main flow passageways has an axial component that directly resists main flow through the main flow passageways aftward along the central axis. Additionally, in some embodiments, the main flow passageways may be circumferentially spaced apart from one another around the central axis. The control flow passageways may extend circumferentially about and along the central axis.

In some embodiments, the cooling air system may be configured in a normal state, the normal state characterized by the absence of breakages in the main flow passageways, to conduct main flow through each of the main flow passageways substantially at a first flow rate. The cooling air system may be configured in the normal state to discharge control flow into each of the main flow passageways. The cooling air system may be configured in a fault state, the fault state characterized by the presence of a breakage in one of the main flow passageways, to conduct main flow through the first main flow passageway substantially at a second flow rate, less than the first flow rate, and to conduct main flow through the second main flow passageway substantially at a third flow rate, greater than the first flow rate. The third flow rate may be substantially equal to twice the first flow rate. The cooling air system may be configured when in the fault state to conduct substantially the same rate of the main flow of cooling air as when in the normal state.

According to yet another aspect of the present disclosure, a method of operating a gas turbine engine including an engine core defining a central axis and a cooling air system may include conducting a main flow of cooling air provided by the compressor section through a plurality of main flow passageways included in the cooling air system to the turbine section, and discharging a control flow of cooling air bled off from the main flow of cooling air away from a first main flow passageway into a second main flow passageway by at least one of a plurality of control flow passageways included in the cooling air system to at least in part directly resist main flow through the second main flow passageway aftward along the central axis.

In some embodiments, conducting the main flow of cooling air provided by the compressor section through the plurality of main flow passageways to the turbine section may include conducting the main flow of cooling air through the plurality of main flow passageways at substantially the same rate when no breakages are present in the main flow passageways during a normal operating state of the cooling air system and when a breakage is present in one of the main flow passageways during a fault operating state of the cooling air system.

These and other features of the present disclosure will become more apparent from the following description of the illustrative embodiments.

DETAILED DESCRIPTION OF THE DRAWINGS

Figure 1:
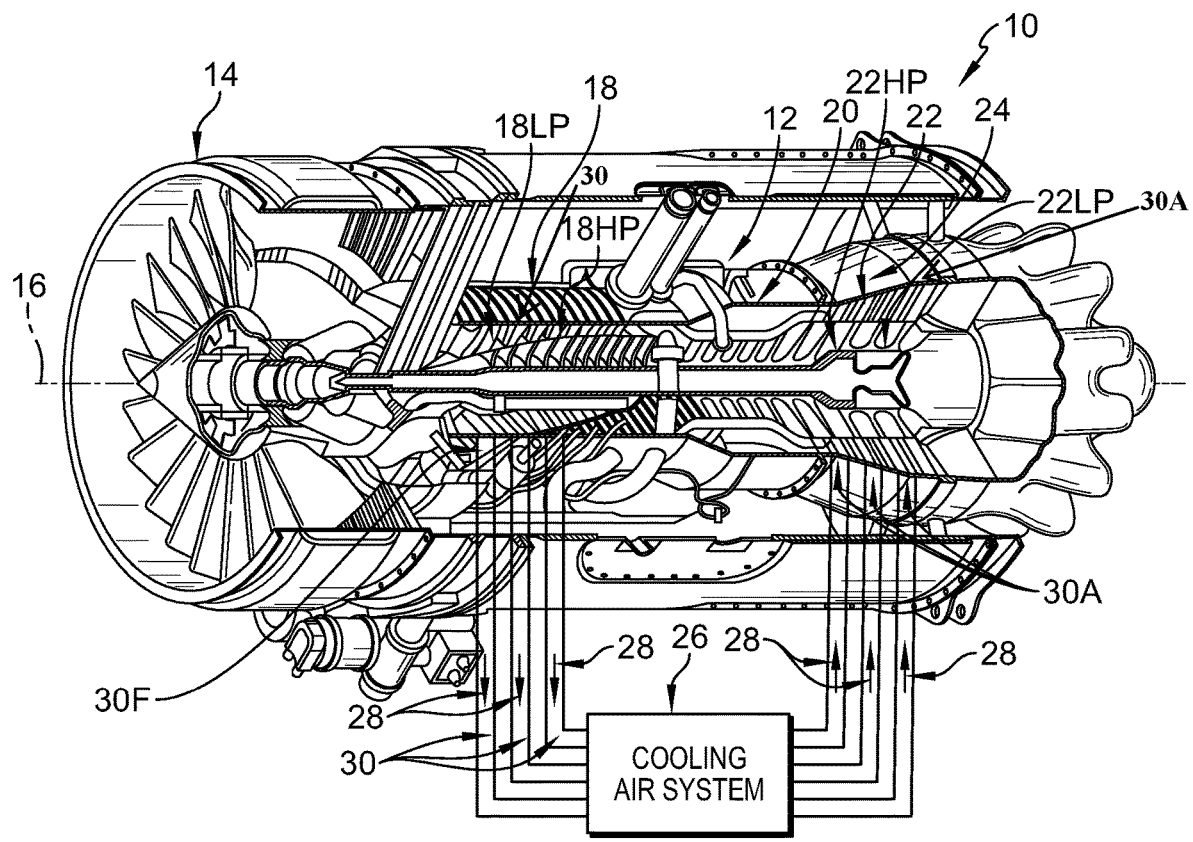
FIG. 1 is a cut-away perspective view of a gas turbine engine including an engine core defining a central axis and having a compressor section and a turbine section located aft of the compressor section along the central axis, and showing diagrammatically a cooling air system fluidly coupled between the compressor section and the turbine section to conduct pressurized air from the compressor section to the turbine section to cool components of the turbine section.

Referring now to FIG. 1, an illustrative gas turbine engine 10 adapted for use in an aircraft is shown. The gas turbine engine 10 includes an engine core 12 and a fan 14. The engine core 12 is configured to pass pressurized air therethrough so that the pressurized air flows aftward along a central axis 16 defined by the engine core 12. The fan 14 is coupled to the engine core 12 to be driven by the engine core 12. In some embodiments, the fan 14 may be configured to discharge pressurized bypass air that is passed around the engine core 12 through one or more ducts that may extend along the central axis 16 coaxially with the engine core 12.

The engine core 12 illustratively includes a compressor section 18, a combustor section 20, and a turbine section 22, each of which is surrounded by a metallic case 24 as shown in FIG. 1. The compressor section 18 is configured to increase the pressure and the temperature of atmospheric air and deliver the air at the increased pressure and temperature to the combustor section 20. The combustor section 20 is configured to mix the air with fuel, ignite the air/fuel mixture, and deliver the combustion products (i.e., hot, high-pressure gases) to the turbine section 22. The turbine section 22 is configured to convert the combustion products to rotational power that drives the compressor section 18 and the fan 14.

The gas turbine engine 10 illustratively includes a cooling air system 26 that is fluidly coupled between the compressor section 18 and the turbine section 22 as shown in FIG. 1. The cooling air system 26 is configured to conduct pressurized air aftward along the central axis 16 from the compressor section 18 to the turbine section 22 to cool components of the turbine section 22 during operation of the engine 10. As discussed below, the cooling air system 26 is configured to deliver cooling air to the turbine section 22 at substantially the same rate when in a normal operating state (i.e., a state where no faults/breakages are present) and when in a fault operating state (i.e., a state where a fault/breakage is present) to improve the performance of the engine 10.

Figure 2:
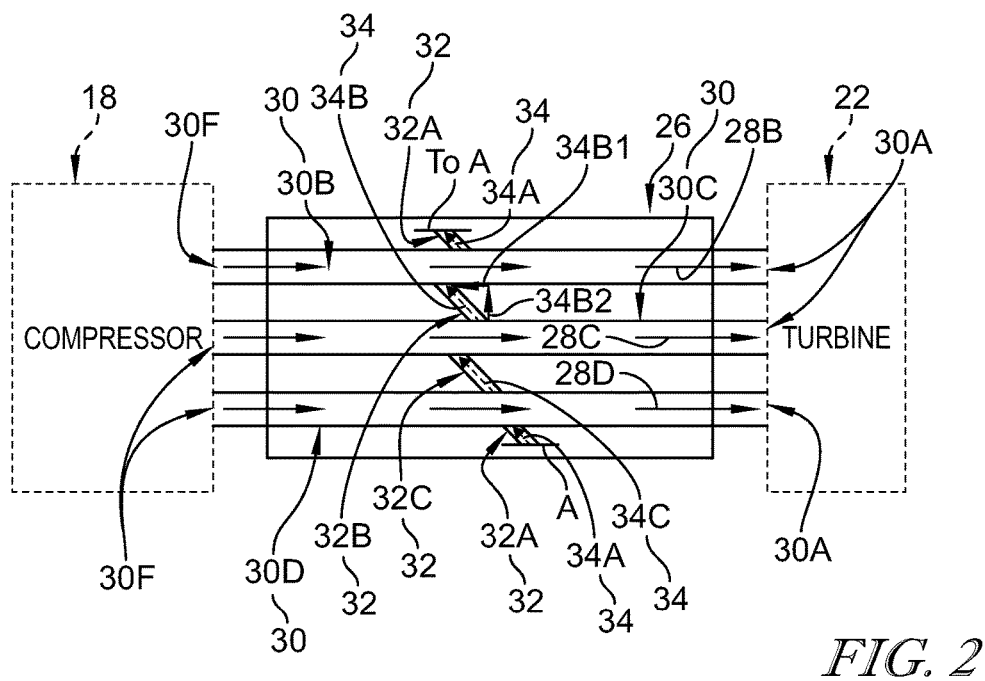
FIG. 2 is a diagrammatic view of the cooling air system of FIG. 1 showing that the cooling air system includes a plurality of main flow passageways each configured to conduct a main flow of cooling air provided by the compressor section directly to the turbine section and a plurality of control flow passageways each fluidly coupling a first main flow passageway to a second main flow passageway and configured to conduct a control flow of cooling air away from the first main flow passageway to the second main flow passageway to resist the main flow of the cooling air conducted by the second main flow passageway.

The cooling air system 26 illustratively includes main flow passageways 30 and control flow passageways 32 as shown in FIG. 2. Each of the main flow passageways 30 has a forward end 30F coupled to the compressor section 18 and an aft end 30A coupled to the turbine section 22. Each of the control flow passageways 32 fluidly couples a first main flow passageway 30 to a second main flow passageway 30. Each of the main flow passageways 30 is configured to conduct a main flow of cooling air provided by the compressor section 18 to the turbine section 22 as indicated by arrows 28. Each of the control flow passageways 32 is configured to discharge a control flow of cooling air, which is smaller than the main flow of cooling air, away from the first main flow passageway 30 into the second main flow passageway 30 as indicated by arrows 34. Each of the control flow passageways 32 is configured to discharge the control flow of cooling air into a second main flow passageway 30 in a direction so as to resist the main flow of the cooling air conducted through the second main flow passageway 30. Because the control flow of cooling air is smaller than the main flow of cooling air, the control flow does not overpower the main flow conducted through the second main flow passageway 30.

The compressor section 18 illustratively includes a low pressure compressor 18LP and a high pressure compressor 18HP located aft of the low pressure compressor 18LP along the central axis 16 as shown in FIG. 1. The low pressure compressor 18LP is configured to pressurize air to a lower pressure than the high pressure compressor 18HP during operation of the gas turbine engine 10. The forward end 30F of at least one of the main flow passageways 30 is fluidly coupled directly to the low pressure compressor 18LP. In some embodiments, the forward ends 30F of more than one of the passageways 30 may be fluidly coupled directly to the low pressure compressor 18LP.

The low pressure compressor 18LP is illustratively embodied as, or otherwise includes, a single-stage compressor. The high pressure compressor 18HP is illustratively embodied as, or otherwise includes, a multi-stage compressor having fourteen stages. In other embodiments, however, the low pressure compressor 18LP may include more than one stage and the high pressure compressor 18HP may include another suitable number of stages.

The turbine section 22 illustratively includes a low pressure turbine 22LP and a high pressure turbine 22HP separate from and located forward of the low pressure turbine 22LP along the central axis 16 as shown in FIG. 1. The low pressure turbine 22LP is coupled to the low pressure compressor 18LP to drive rotation of the low pressure compressor 18LP about the central axis 16. The high pressure turbine 22HP is coupled to the high pressure compressor 18HP to drive rotation of the high pressure compressor 18HP about the central axis 16. The aft end 30A of at least one of the main flow passageways 30 is fluidly coupled directly to the high pressure turbine 22HP. In some embodiments, the aft ends 30A of more than one of the passageways 30 may be fluidly coupled directly to the high pressure turbine 22HP.

The low pressure turbine 22LP is illustratively embodied as, or otherwise includes, a three-stage turbine. The high pressure turbine 22HP is illustratively embodied as, or otherwise includes, a two-stage turbine. In other embodiments, however, the low pressure turbine 22LP and the high pressure turbine 22HP may each include another suitable number of stages.

Referring now to FIG. 2, the main flow passageways 30 illustratively include three main flow passageways 30B, 30C, 30D and the control flow passageways 32 include three control flow passageways 32A, 32B, 32C. In other embodiments, however, the main flow passageways 30 and the control flow passageways 32 may each include another suitable number of passageways.

In some embodiments, the main flow passageways 30 and the control flow passageways 32 may be housed by, or otherwise supported by, a manifold that is configured to couple to the case 24. In other embodiments, the main flow passageways 30 and the control flow passageways 32 may be supported by the case 24 without the use of a manifold.

The main flow passageways 30 are illustratively circumferentially spaced around the central axis 16 as suggested by FIG. 1. The control flow passageways 32 extend circumferentially about and forwardly along the central axis 16 as suggested by FIGS. 1 and 2. As best seen in FIG. 2, the control flow passageways 32 are shaped to direct the control flow away from the turbine section 22 toward the compressor section 18.

The illustrative interconnections between the control flow passageways 32A, 32B, 32C and the main flow passageways 30B, 30C, 30D are shown in FIG. 2. The passageway 32A fluidly couples the passageway 30B to the passageway 30D. The passageway 32B fluidly couples the passageway 30C to the passageway 30B. The passageway 32C fluidly couples the passageway 30D to the passageway 30C.

The main flow passageways 30B, 30C, 30D are illustratively configured to conduct the main flow of cooling air from the compressor section 18 to the turbine section 22 as indicated by respective arrows 28B, 28C, 28D during operation of the engine 10 as shown in FIG. 2. The control flow passageway 32A is configured to discharge the control flow of cooling air, which is bled off from the main flow of cooling air conducted through the passageway 30B, into the passageway 30D as indicated by arrow 34A. The control flow passageway 32B is configured to discharge the control flow of cooling air, which is bled off from the main flow of cooling air conducted through the passageway 30C, into the passageway 30B as indicated by arrow 34B. The control flow passageway 32C is configured to discharge the control flow of cooling air, which is bled off from the main flow of cooling air conducted through the passageway 30D, into the passageway 30C as indicated by arrow 34C.

The control flow of cooling air is illustratively discharged by the control flow passageways 32A, 32B, 32C into the respective passageways 30D, 30B, 30C as indicated by respective arrows 34A, 34B, 34C in substantially the same manner during operation of the engine 10 as shown in FIG. 2. Using the passageway 32B as an example, the control flow of cooling air discharged by the passageway 32B into the passageway 30B as indicated by arrow 34B has an axial component 34B1 and a circumferential component 3462. The axial component 34B1 is directly opposed to the main flow conducted by the passageway 30B as indicated by arrow 28B. As such, the axial component 34B1 directly resists the main flow conducted through the passageway 30B. Thus, the passageway 32B is shaped to discharge control flow into the passageway 30B to at least in part directly resist main flow through the passageway 30B aftward along the central axis 16.

Figure 3:
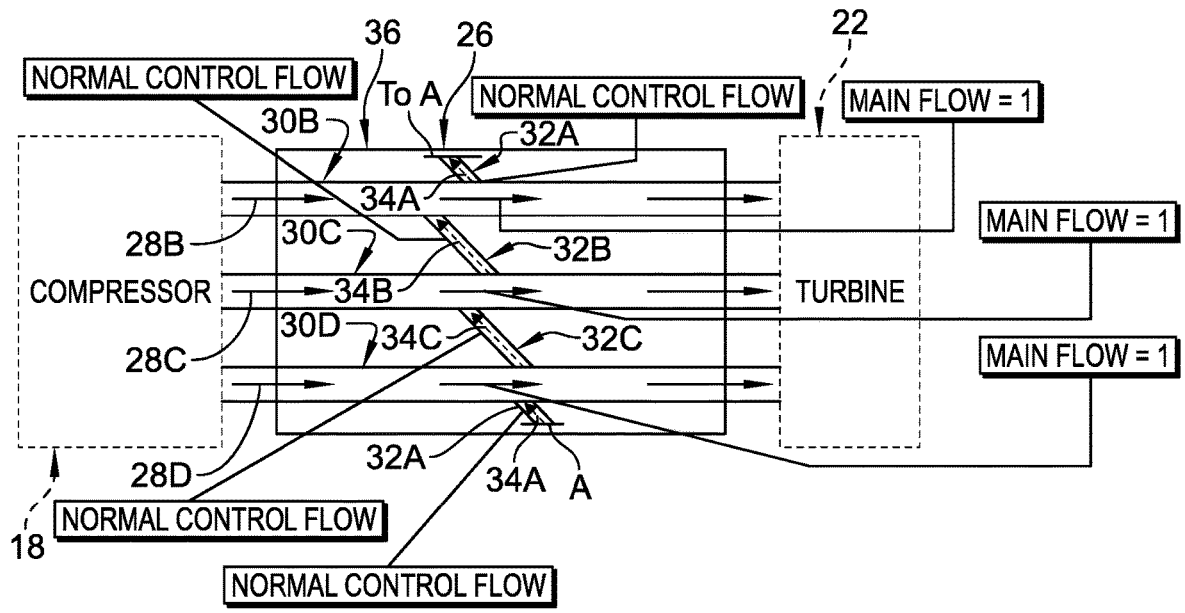
FIG. 3 is a diagrammatic view of the cooling air system of FIG. 2 showing that the cooling air system is operable in a normal operating state in which main flow is conducted by each of the main flow passageways and control flow is conducted to each of the main flow passageways.
Figure 4:
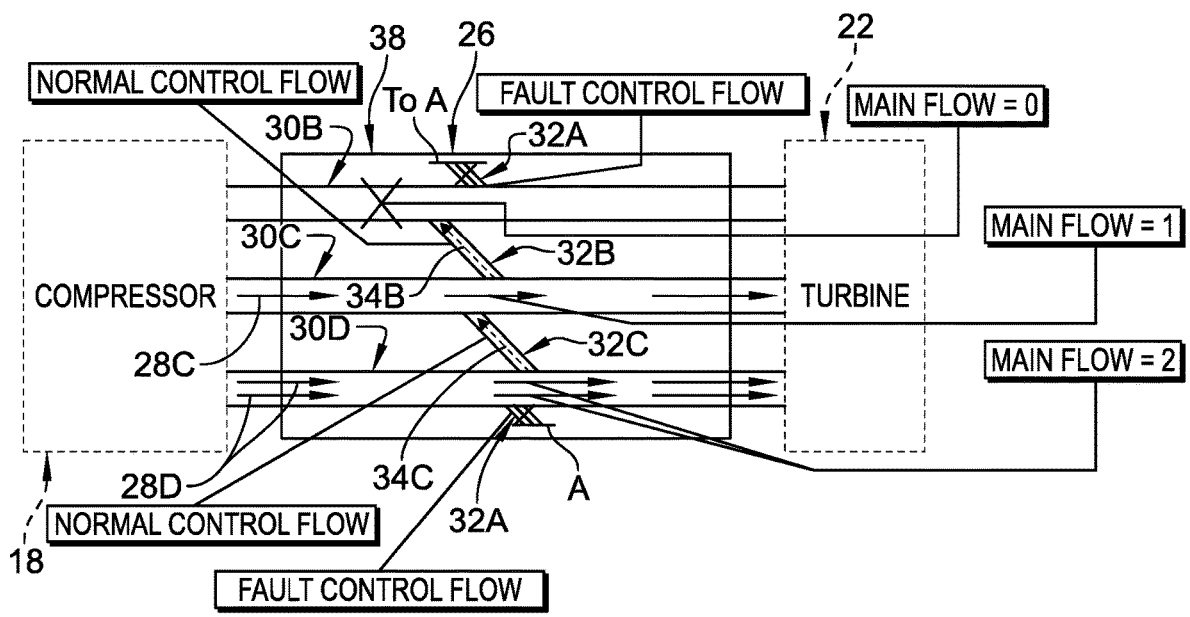
FIG. 4 is another diagrammatic view of the cooling air system of FIG. 2 showing that the cooling air system is operable in a fault operating state in which substantially no main flow is conducted by a first main flow passageway because of a breakage and substantially no control flow is conducted to the third main flow passageway from the first main flow passageway so that the flow rate through the third main flow passageway is increased to make up for the reduced flow rate through the first main flow passageway.

Referring now to FIGS. 3 and 4, two different operating states of the illustrative cooling air system 26 are shown during operation of the engine 10. Main flow is conducted by the main flow passageways 30B, 30C, 30D at substantially the same rate when the cooling air system 26 is in the normal operating state 36 and when the system 26 is in the fault operating state 38. As described below, the cooling air system 26 is configured to compensate for a reduction in main flow accompanying a fault in one of the passageways 30B, 30C, 30D by increasing the main flow rate through another of the intact passageways 30B, 30C, 30D. As described herein, a fault in one of the passageways 30B, 30C, 30D is a breakage, a leak, or the like.

Referring now to FIG. 3, when the cooling air system 26 is in the normal operating state 36 during operation of the engine 10, each of the main flow passageways 30B, 30C, 30D is intact such that no fault is present. The normal operating state 36 of the system 26 is characterized by main flow through each of the passageways 30B, 30C, 30D at substantially the same rate. Thus, in the operating state 36, main flow indicated by the arrows 28B, 28C, 28D and designated as "main flow=1" in FIG. 3 refers to main flow through each of the passageways 30B, 30C, 30D at substantially the same flow rate.

When the cooling air system 26 is in the normal operating state 36, control flow is illustratively discharged to the main flow passageways 30B, 30C, 30D by respective control flow passageways 32B, 32C, 32A at substantially the same flow rate as shown in FIG. 3. Thus, in the operating state 36, control flow indicated by the arrows 34A, 34B, 34C and designated as "normal control flow" in FIG. 3 refers to control flow discharged by each of the passageways 32A, 32B, 32C at substantially the same flow rate. Because main flow is conducted through the passageways 30B, 30C, 30D in the operating state 36, the normal control flow discharged by the passageways 32A, 32B, 32C is bled off from the main flow.

In the illustrative embodiment, the control flow indicated by arrows 34A, 34B, 34C is less than the main flow indicated by arrows 28B, 28C, 28D. For example, when the cooling air system 26 is in the normal operating state 36 shown in FIG. 3, the control flow indicated by arrows 34A, 34B, 34C may be between about 1/10 to 1/30 of the main flow indicated by arrows 28B, 28C, 28D. In other embodiments, however, the control flow indicated by arrows 34A, 34B, 34C may be another suitable fraction of the main flow indicated by arrows 28B, 28C, 28D when the system 26 is in the operating state 36. Regardless, the control flow indicated by arrows 34A, 34B, 34C is discharged by the control flow passageways 32A, 32B, 32C at a flow rate greater than zero when the system 26 is in the normal operating state 36.

Referring now to FIG. 4, when the cooling air system 26 is in the fault operating state 38 during operation of the engine 10, a breakage in the main flow passageway 30B is present and the main flow passageways 30C, 30D are intact such that no breakages are present. However, when the system 26 is in the fault operating state 38, a breakage may be present in any one of the main flow passageways 30B, 30C, 30D and the other of passageways 30B, 30C, 30D may be intact.

Because a breakage is present in the main flow passageway 30B in the fault operating state 38 as suggested by FIG. 4, main flow is not conducted by the passageway 30B from the compressor 18 to the turbine 22. Rather, due at least in part to resistance provided by the control flow conducted through the control flow passageway 32B, main flow provided to the passageway 30B from the compressor 18 is discharged outside of the passageway 30B proximate the location of the breakage. Because no main flow is conducted by the passageway 30B to the turbine 22 in the operating state 38, the main flow rate through the passageway 30B in the state 38 is zero or substantially zero and is designated as "main flow=0" in FIG. 4. Such main flow is less than the main flow through each of the main flow passageways 30B, 30C, 30D when the cooling air system 26 is in the normal operating state 36.

When zero or substantially zero main flow is conducted through the main flow passageway 30B, zero or substantially zero control flow is bled off from that main flow and discharged by the control flow passageway 32A to the main flow passageway 30D as shown in FIG. 4. Zero or substantially zero control flow discharged by the passageway 32A to the passageway 30D is designated as "fault control flow." Such control flow is less than the normal control flow discharged by each of the control flow passageways 32A, 32B, 32C when the cooling air system 26 is in the normal operating state 36.

When zero or substantially zero control flow is discharged by the control flow passageway 32A into the main flow passageway 30D, no or substantially no resistance is illustratively provided to the main flow conducted through the passageway 30D as shown in FIG. 4. As such, when the cooling air system 26 is in the fault operating state 38, main flow is conducted through the passageway 30D at a flow rate greater than the main flow rate through the passageway 30D when the system 26 is in the normal operating state 36. Specifically, when the system 26 is in the state 38, main flow is conducted through the passageway 30D at a flow rate that is twice the flow rate of main flow through the passageway 30D when the system 26 is in the state 36. Main flow conducted through the passageway 30D when the system 26 is in the state 38 is indicated by arrows 28D and designated as "main flow=2."

When the cooling air system 26 is in the fault operating state 38, normal control flow is illustratively discharged by the control flow passageways 32B, 32C into respective main flow passageways 30B, 30C as shown in FIG. 4. Additionally, when the system 26 is in the state 38, main flow is conducted through the passageway 30C at substantially the same flow rate that main flow is conducted through the passageway 30C when the system 26 is in the normal operating state 36.

Referring again to FIGS. 3 and 4, a method of operating the engine 10 will now be described. The method includes conducting the main flow of cooling air provided by the compressor section 18 through the main flow passageways 30 to the turbine section 22. The method further includes discharging the control flow of cooling air bled off from the main flow of cooling air away from a first main flow passageway 30 into a second main flow passageway 30 by at least one of the control flow passageways 32 to at least in part directly resist main flow through the second main flow passageway 30 aftward along the central axis 16. Conducting the main flow through the passageways 30 to the turbine section 22 includes conducting the main flow through the passageways 30 at substantially the same rate when the passageways 30 are intact during the normal operating state 36 of the cooling air system 26 and when a breakage is present in one of the passageways 30 during the fault operating state 38 of the system 26.

The present disclosure may be applicable to a system that supplies cooling air to one or more components (e.g., the turbine section 22) of an engine (e.g., the gas turbine engine 10) using external feed pipes (e.g., main flow passageways 30B, 30C, 30D). Such systems may be designed to account for pipe faults (e.g., breakage of one of the passageways 30B, 30C, 30D in the fault operating state 38), and the present disclosure may provide a performance benefit over current design approaches.

Cooling air may be supplied to engines via pipes. Taking into account the failure of one of these pipes, the other intact pipes may be required to supply sufficient cooling air to prevent a failure of the engine. As such, when all the pipes are intact, more cooling air than is needed may be supplied by existing cooling air systems.

The present disclosure may provide an air system (e.g., the cooling air system 26) that provides substantially the same amount of cooling air to an engine both when supply pipes included in the air system are intact and when a fault occurs (i.e., when one of the supply pipes breaks or leaks). The present disclosure may utilize interconnected passages (e.g., the passageways 30B, 30C, 30D and the control flow passageways 32A, 32B, 32C). Specifically, the present disclosure may utilize interconnected passages to increase air flow (i.e., the main flow of cooling air) through the intact pipes when one pipe breaks by connecting the control flow of the broken pipe (e.g., the control flow from the passageway 30B indicated by arrow 32A) to a different pipe (e.g., the passageway 30D).

More or less resistance to main flow through the passageways may be provided when the control flow is changed. The control flow may be 1/10 to 1/30 of the main through flow. When the control flow is turned on (e.g., in the normal operating state 36 of the cooling air system 26), the passageway may be in a high resistance state. When the control flow is turned off (e.g., in the fault operating state 38 of the system 26), the passageway may be in a low resistance state. The passageway may flow 2× or more through flow (e.g., the "main flow=2" through the main flow passageway 30D in the state 38) when in the low resistance state.

In contrast to current applications, the present disclosure may rely on the baseline state of the system to be the low flow, high resistance state with the control flow on (e.g., the normal operating state 36 of the system 26), rather than the high flow, low resistance state with the control flow off. By connecting the control flow of each main flow passageway to another of the main flow passageways and using it to meter the main flow of the another main flow passageway (e.g., the interconnections in the system 26), a sufficient amount of cooling air may be provided to an engine both when all the cooling pipes are intact and when a breakage occurs in one of the cooling pipes. When a breakage occurs in one of the cooling pipes fails, the control flow provided to another cooling pipe may be turned off. As such, the resistance to flow through the another cooling pipe may be decreased (e.g., the decreased resistance to main flow conducted through the passageway 30D in the fault operating state 38 of the system 26), and greater flow through the another cooling pipe may occur.

Current designs may provide more cooling air than is needed when all of the pipes included in the system are intact. However, such designs may not provide as much cooling air when a fault occurs in one of the pipes. The present disclosure may provide the amount of cooling air needed when the pipes of the system are intact, as well as the same or substantially the same amount of cooling air needed when a fault occurs in one of the pipes. As such, the present disclosure may provide a system that utilizes less cooling air than current designs when all of the pipes of the system are intact. Less cooling air usage may lower specific fuel consumption of the engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core defining a central axis, the engine core including a compressor section and a turbine section located aft of the compressor section along the central axis, and
a cooling air system fluidly coupled between the compressor section and the turbine section to conduct pressurized air from the compressor section to the turbine section to cool components of the turbine section,
wherein the cooling air system includes (i) a plurality of main flow passageways each having a forward end coupled to the compressor section and an aft end coupled to the turbine section, each of the plurality of main flow passageways configured to conduct a main flow of cooling air provided by the compressor section to the turbine section to cool the turbine section during operation thereof and (ii) a plurality of control flow passageways each fluidly coupling a first main flow passageway of the plurality of main flow passageways to a second main flow passageway of the plurality of main flow passageways, each of the plurality of control flow passageways configured to discharge a control flow of cooling air, smaller than the main flow of cooling air, away from the first main flow passageway into the second main flow passageway in a direction so as to resist the main flow of cooling air conducted by the second main flow passageway, and
wherein the plurality of control flow passageways are configured so that the control flow of cooling air discharged into the plurality of main flow passageways has an axial component that directly resists, in a forward direction, the main flow of cooling air through the plurality of main flow passageways along the central axis that is traveling in an aftward direction.

2. The gas turbine engine of claim 1, wherein the plurality of control flow passageways are configured to direct the control flow of cooling air away from the turbine section toward the compressor section.

3. The gas turbine engine of claim 1, wherein the compressor section includes a low pressure compressor and a high pressure compressor located aft of the low pressure compressor along the central axis and the forward end of at least one of the plurality of main flow passageways is fluidly coupled directly to the low pressure compressor.

4. The gas turbine engine of claim 3, wherein the turbine section includes a high pressure turbine coupled to the high pressure compressor to drive rotation of the high pressure compressor about the central axis and a low pressure turbine coupled to the low pressure compressor to drive rotation of the low pressure compressor about the central axis and located aft of the high pressure turbine along the central axis and the aft end of the at least one of the plurality of main flow passageways is fluidly coupled directly to the high pressure turbine.

5. The gas turbine engine of claim 1, wherein when the cooling air system is configured in a normal state, the normal state characterized by the absence of a breakage in the plurality of main flow passageways, to conduct the main flow of cooling air through each of the plurality of main flow passageways substantially at a first flow rate.

6. The gas turbine engine of claim 5, wherein when the cooling air system is configured in a fault state, the fault state characterized by the presence of the breakage in one of the plurality of main flow passageways, to conduct the main flow of cooling air through the first main flow passageway substantially at a second flow rate, less than the first flow rate, and to conduct main flow of cooling air through the second main flow passageway substantially at a third flow rate, greater than the first flow rate.

7. The gas turbine engine of claim 6, wherein the third flow rate is substantially equal to twice the first flow rate.

8. The gas turbine engine of claim 1, further comprising a normal state, the normal state characterized by the absence of a breakage in the plurality of main flow passageways, and a fault state, the fault state characterized by the presence of the breakage in one of the plurality of main flow passageways, wherein the cooling air system is configured when in the fault state to conduct substantially the same rate of the main flow of cooling air as when in the normal state.

9. A cooling air system for a gas turbine engine having an engine core defining a central axis, the cooling air system comprising
a plurality of main flow passageways, each configured to fluidly couple a compressor section of the engine core at a forward end of the main flow passageway to a turbine section of the engine core at an aft end of the main flow passageway to conduct a main flow of cooling air, and
a plurality of control flow passageways each fluidly coupled between a first main flow passageway of the plurality of main flow passageways and a second main flow passageway of the plurality of main flow passageways to conduct a control flow of cooling air bled off from the main flow of cooling air away from the first main flow passageway to the second main flow passageway when the cooling air system is used in the gas turbine engine, wherein the plurality of control flow passageways are configured to discharge the control flow of cooling air into the plurality of main flow passageways to resist the main flow of cooling air through the main flow passageways, and wherein the plurality of control flow passageways are configured so that the control flow of cooling air discharged into the plurality of main flow passageways has an axial component that directly resists, in a forward direction, the main flow of cooling air through the plurality of main flow passageways along the central axis that is traveling in an aftward direction.

10. The cooling air system of claim 9, wherein when the cooling air system is configured in a normal state, the normal state characterized by the absence of a breakage in the plurality of main flow passageways, to conduct the main flow of cooling air through each of the plurality of main flow passageways substantially at a first flow rate.

11. The cooling air system of claim 10, wherein when the cooling air system is configured in the normal state to discharge the control flow of cooling air into each of the plurality of main flow passageways.

12. The cooling air system of claim 11, wherein when the cooling air system is configured in a fault state, the fault state characterized by the presence of the breakage in one of the plurality of main flow passageways, to conduct the main flow of cooling air through the first main flow passageway substantially at a second flow rate, less than the first flow rate, and to conduct the main flow of cooling air through the second main flow passageway substantially at a third flow rate, greater than the first flow rate.

13. The cooling air system of claim 12, wherein the third flow rate is substantially equal to twice the first flow rate.

14. The cooling air system of claim 9, further comprising a normal state, the normal state characterized by the absence of a breakage in the plurality of main flow passageways, and a fault state, the fault state characterized by the presence of the breakage in one of the plurality of main flow passageways, wherein the cooling air system is configured when in the fault state to conduct substantially the same rate of the main flow of cooling air as when in the normal state.

15. A method of operating a gas turbine engine, the gas turbine engine including an engine core defining a central axis and a cooling air system, the engine core including a compressor section and a turbine section located aft of the compressor section along the central axis, and the cooling air system fluidly coupled between the compressor section and the turbine section to conduct pressurized air from the compressor section to the turbine section to cool components of the turbine section, the method comprising:

conducting a main flow of cooling air provided by the compressor section through a plurality of main flow passageways included in the cooling air system to the turbine section, each of the plurality of main flow passageways having a forward end coupled to the compressor section and an aft end coupled to the turbine section, and discharging a control flow of cooling air bled off from the main flow of cooling air away from a first main flow passageway of the plurality of main flow passageways into a second main flow passageway of the plurality of main flow passageways by at least one of a plurality of control flow passageways included in the cooling air system to resist the main flow of cooling air through the second main flow passageway, and wherein the plurality of control flow passageways are configured so that the control flow of cooling air discharged into the plurality of main flow passageways has an axial component that directly resists, in a forward direction, the main flow of cooling air through the plurality of main flow passageways along the central axis that is traveling in an aftward direction.

16. The method of claim 15, wherein conducting the main flow of cooling air provided by the compressor section through the plurality of main flow passageways to the turbine section comprises: conducting the main flow of cooling air through the plurality of main flow passageways during a normal operating state of the cooling air system, the normal operating state characterized by the absence of a breakage in the plurality of main flow passageways at substantially the same rate as conducting the main flow of cooling air through the plurality of main flow passageways during a fault operating state of the cooling air system, the fault operating state characterized by a breakage in one of the plurality of main flow passageways.

* * * * *